US010052720B2

(12) United States Patent
Gu et al.

(10) Patent No.: US 10,052,720 B2
(45) Date of Patent: Aug. 21, 2018

(54) METHOD OF LASER WELDING COATED STEEL SHEETS WITH ADDITION OF ALLOYING ELEMENTS

(71) Applicant: Magna International Inc., Aurora (CA)

(72) Inventors: Hongping Gu, Newmarket (CA); Aldo Van Gelder, Newmarket (CA); Jeremiah John Brady, Knoxville, TN (US); Edward K. Steinebach, Oakridge, TN (US); Mark Justin Jones, Knoxville, TN (US)

(73) Assignee: Magna International Inc., Aurora (CA)

( * ) Notice: Subject to any disclaimer, the term of this patent is extended or adjusted under 35 U.S.C. 154(b) by 200 days.

(21) Appl. No.: 15/111,031

(22) PCT Filed: Sep. 15, 2015

(86) PCT No.: PCT/CA2015/050887
§ 371 (c)(1),
(2) Date: Jul. 12, 2016

(87) PCT Pub. No.: WO2016/041064
PCT Pub. Date: Mar. 24, 2016

(65) Prior Publication Data
US 2016/0332256 A1  Nov. 17, 2016

Related U.S. Application Data

(60) Provisional application No. 62/051,573, filed on Sep. 17, 2014.

(51) Int. Cl.
*B23K 26/26* (2014.01)
*B23K 26/322* (2014.01)
(Continued)

(52) U.S. Cl.
CPC ............ *B23K 26/24* (2013.01); *B23K 26/082* (2015.10); *B23K 26/144* (2015.10);
(Continued)

(58) Field of Classification Search
CPC ...... B23K 26/26; B23K 26/21; B23K 26/211; B23K 26/322; B23K 26/24; B23K 26/242; B23K 9/025; B23K 31/02; B23K 37/0408
(Continued)

(56) References Cited

U.S. PATENT DOCUMENTS 6,652,990 B2 * 11/2003 Carey, II .............. B23K 35/262
206/524.3
2013/0078031 A1  3/2013 Nakamura et al.
(Continued)

FOREIGN PATENT DOCUMENTS

CA      2850409        4/2013
DE  102013101953 A1   8/2014
(Continued)

OTHER PUBLICATIONS

Canadian Intellectual Property Office, Written Opinion and International Search Report for PCT/CA2015/050887 Dec. 9, 2015.
(Continued)

*Primary Examiner* — Samuel M Heinrich
(74) *Attorney, Agent, or Firm* — Middleton Reutlinger

(57) ABSTRACT

A process is disclosed for laser-welding sheet metal plates that have an aluminum-silicon containing pre-coat layer. The pre-coated sheet metal plates are arranged one relative to another such that an edge of one of the plates is adjacent to and in contact with an edge of the other one of the plates, and a laser-welded joint is formed along the adjacent edges of the pre-coated plates. In particular the joint is formed absent removing the aluminum-silicon containing layer from along the adjacent edges, such that aluminum from the aluminum-silicon containing layer enters into the melt pool that is formed. Additionally, an alloying material is introduced into the melt pool during forming the laser-welded
(Continued)

joint and forms a compound with at least some of the aluminum in the melt pool.

23 Claims, 4 Drawing Sheets

(51) Int. Cl.
*B23K 9/025* (2006.01)
*B23K 31/02* (2006.01)
*B23K 26/24* (2014.01)
*B23K 26/60* (2014.01)
*B23K 26/082* (2014.01)
*B23K 26/144* (2014.01)
*B23K 103/16* (2006.01)
*B23K 101/00* (2006.01)
*B23K 103/08* (2006.01)

(52) U.S. Cl.
CPC ............ *B23K 26/322* (2013.01); *B23K 26/60* (2015.10); *B23K 2201/006* (2013.01); *B23K 2203/08* (2013.01); *B23K 2203/166* (2015.10)

(58) Field of Classification Search
USPC ............................. 219/121.63, 121.64, 59.1
See application file for complete search history.

(56) References Cited

U.S. PATENT DOCUMENTS

2014/0003860 A1* 1/2014 Evangelista ........... B23K 9/235
403/270
2014/0231395 A1* 8/2014 Brandt .................. B23K 26/26
219/74

FOREIGN PATENT DOCUMENTS

EP 2737971 A1 6/2014
WO 2014087227 A1 6/2014

OTHER PUBLICATIONS

Cottam, R. Laser Materials Processing for Improved Corrosion Performance. INTECH Open Access Publisher, 2012 Nov. 26, 2015.

* cited by examiner

METHOD OF LASER WELDING COATED STEEL SHEETS WITH ADDITION OF ALLOYING ELEMENTS

FIELD OF THE INVENTION

The present invention relates generally to a method and system for laser welding sheet metal components, such as for instance components for use in automobiles and other assemblies. More particularly, the present invention relates to a process and system for laser welding coated sheet metal plates with the addition of alloying elements into the melt pool.

BACKGROUND OF THE INVENTION

The automotive industry faces an ongoing challenge of improving safety and crash-survivability of the automobiles it produces, while at the same time improving fuel efficiency to meet or exceed legislated minimum standards. One way of achieving both goals relies on the use of lighter weight materials that possess excellent mechanical strength, high impact resistance, etc. In this way the overall weight of the vehicle can be reduced, so as to achieve improved fuel efficiency, without sacrificing the capacity to absorb impact energy in the event of a collision. This strategy is widely employed to produce anti-intrusion, structural or safety components of automotive vehicles, such as for instance bumpers, door reinforcements, B-pillar reinforcements and roof reinforcements.

Oftentimes it is necessary to join together different sheet metal pieces in order to form a desired part. For instance, "butt-welded blanks" are formed by joining together, preferably by laser welding, two or more steel blanks of different compositions and/or different thicknesses. After the welded-blanks have been cold-pressed, parts are obtained having properties of mechanical strength, pressability and impact absorption that vary within the parts themselves. It is therefore possible to provide different mechanical properties at different locations within a part, without imposing an unnecessary or costly penalty on the entire part. For instance a B-pillar may be obtained by joining together a first steel blank having a high mechanical strength and a second steel blank having a relatively lower mechanical strength. During an impact, deformation is concentrated within the portion of the B-pillar that is formed from the second steel blank, such that the energy of the impact is safely absorbed in a desired fashion.

In order to avoid the need to provide a controlled furnace atmosphere during hot forming of such laser welded blanks, and also to provide improved corrosion resistance, it is common to fabricate such blanks using coated sheet metal materials, such as for instance boron steels with an aluminum-silicon pre-coating. Unfortunately, the process of laser welding such pre-coated sheet metal materials results in some of the pre-coat material being transferred into the molten area that is created during the welding operation. Subsequent austenizing and quenching of the welded blank results in the metal elements from the pre-coat material becoming alloyed with the iron or other elements of the steel sheet, thereby forming brittle, intermetallic compounds in the welded joint. On subsequent mechanical loading, these intermetallic compounds tend to be the site of onset of rupture under static or dynamic conditions. As such, the overall deformability of the welded joints after heat treatment is significantly reduced by the presence of these intermetallic compounds resulting from welding and subsequent alloying and austenizing. Another adverse effect resulting from aluminum contamination in the weld metal is the inhibition of the formation of martensite structure in a subsequent hot-stamping operation, such that the weld metal has reduced strength.

In U.S. Pat. No. 8,614,008, Canourgues et al. note that it is desirable to eliminate the source of the above-mentioned intermetallic compounds, namely the initial surface metal coating that is melted during laser welding. However, simply eliminating the pre-coated area on either side of the future weld joint, after the welding operation, results in areas on either side of the welded joint that no longer have any surface metal pre-coating. This occurs because the width of the area from which the pre-coating is removed must be at least equal to the width of the area that is melted during welding, so as not to encourage subsequent formation of intermetallic areas. Canourgues et al. note that in practice the width of pre-coat that is removed must be much more than this minimum amount to allow for fluctuations in the width of the molten area during the assembly operation. Unfortunately, during further alloying and austenizing heat treatment, scale formation and decarburizing occurs within the uncoated areas that are located next to the weld. Further, it is these uncoated and therefore unprotected areas that tend to corrode when the parts go into service.

Canourgues et al. go on to disclose their surprising discovery that eliminating only a portion of the pre-coat is still effective to solve the above-noted corrosion problem. In particular, their solution involves removing the entire thickness of the metal alloy layer while leaving in place the underlying intermetallic alloy layer that is in contact with the steel substrate. Canourgues et al. stress the precise removal of the metal alloy layer, including measuring the emissivity or reflectivity of the surface that is exposed during the removal process, and stopping the removal when a difference between the measured value and a reference value exceeds a critical threshold. Since the intermetallic alloy layer remains undisturbed during the removal of the metal alloy layer, the width of the area from which the metal alloy layer is removed may be 20-40% larger than the half width of the weld. During the welding process the metal alloy layer cannot melt into the weld pool, and as such the intermetallic areas do not form along the welded joint. The undisturbed intermetallic alloy layer on either side of the welded joint provides protection against corrosion when the part goes into service, but does not contribute significantly to the formation of intermetallic compounds in the welded joint.

The solution that is disclosed by Canourgues et al. is elegant and results in a strong weld joint that is protected against corrosion, but it is also very difficult to implement in practice. In particular, it is very difficult to achieve precise removal of the metal alloy layer by mechanical brushing or laser ablation while leaving the underlying intermetallic alloy undisturbed. Further, the process is time consuming and labor intensive, since each part of a welded blank must be handled separately, placed in a first work station to undergo removal of the metal alloy layer, moved to a second work station and positioned relative to another part of the welded blank, and then finally the separate parts are welded together in the second work station. Of course, operating separate work stations for the removal of the metal alloy layer and for the welding process increases floor-space usage requirements, and necessitates the duplication of laser sources and laser optic assemblies, etc. This is necessarily the case because a pulsed-wave laser is used to remove the metal alloy layer and a continuous-wave laser is used to perform laser welding. In particular, Canourgues et al. describe the use of a high energy-density beam, which causes vaporization and expulsion of the surface of the pre-coat.

It would be beneficial to overcome at least some of the above-mentioned limitations and disadvantages of the prior art.

SUMMARY OF THE INVENTION

According to an aspect of at least one embodiment of the instant invention, a process is disclosed for laser welding together sheet metal plates, the sheet metal plates being pre-coated with an aluminum-silicon containing layer, the process comprising: arranging the pre-coated sheet metal plates one relative to the other such that an edge of one of the plates is adjacent to and in contact with an edge of the other one of the plates; forming a laser weld joint along the adjacent edges of the pre-coated sheet metal plates, absent removing the aluminum-silicon containing layer from along said adjacent edges, such that aluminum from the aluminum-silicon containing layer enters a melt pool that is formed during forming the laser weld joint; and introducing an alloying material into the melt pool during forming the laser weld joint, wherein the alloying material and at least some of the aluminum that enters the melt pool from the aluminum-silicon layer forms a compound in the melt pool.

According to an aspect of at least one embodiment of the instant invention, a process is disclosed for laser welding together sheet metal plates, the sheet metal plates having a substrate that is pre-coated with an aluminum-silicon containing layer, the process comprising: arranging a first pre-coated sheet metal plate relative to a second pre-coated sheet metal plate, such that an edge of the first plate and an edge of the second plate are disposed adjacent to one another and define an interface between the first plate and the second plate; scanning a defocused laser beam along the interface between the first plate and the second plate, thereby irradiating the adjacent edges of the first and second plates; during scanning the defocused laser beam, directing a powdered alloying material toward the irradiated edges of the first and second plates, thereby forming a clad layer of the powdered alloying material onto the aluminum-silicon containing pre-coat layer; and subsequent to forming the clad layer, scanning a focused laser beam along the interface between the first plate and the second plate to form a laser weld joint therebetween, wherein the focused laser beam creates a melt pool comprising substrate material from the first and second plates, aluminum from the aluminum-silicon containing pre-coat layer, and alloying material from the clad layer; and wherein the alloying material forms a compound with at least some of the aluminum in the melt pool.

According to an aspect of at least one embodiment of the instant invention, a process is disclosed for laser welding together sheet metal plates, the sheet metal plates being pre-coated with an aluminum-silicon containing layer, the process comprising: arranging a first pre-coated sheet metal plate relative to a second pre-coated sheet metal plate, such that an edge of the first plate and an edge of the second plate are adjacent to one another and define an interface between the first plate and the second plate; in a single pass, irradiating with a focused laser beam an area of each of the plates that is adjacent the interface, so as to form a melt pool that includes aluminum from the aluminum-silicon containing layer within the irradiated area of each plate; and during irradiating, introducing an alloying material into the melt pool, wherein the alloying material forms a compound with at least some of the aluminum in the melt pool.

According to an aspect of at least one embodiment of the instant invention, a system is disclosed for laser-welding together pre-coated sheet metal plates, comprising: a support for holding a first pre-coated sheet metal plate in a predetermined orientation relative to a second pre-coated sheet metal plate, such that an edge of the first plate and an edge of the second plate are disposed adjacent to one another and define an interface; at least one laser optic assembly in optical communication with a laser source; at least one actuator for relatively moving the at least one laser optic assembly relative to the support; and a powder delivery conduit in communication with a source of a powdered alloying material and having an outlet end disposed in front of the at least one laser optic along a scanning direction, the position of the outlet end of the powder delivery conduit being fixed relative to the at least one laser optic for directing a stream of the powdered alloying material toward a predetermined point along the interface during relatively moving the at least one laser optic assembly relative to the support.

BRIEF DESCRIPTION OF THE DRAWINGS

The instant invention will now be described by way of example only, and with reference to the attached drawings, wherein similar reference numerals denote similar elements throughout the several views. It should be understood that the drawings are not necessarily to scale. In certain instances, details that are not necessary for an understanding of the disclosure or that render other details difficult to perceive have been omitted.

DETAILED DESCRIPTION OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Figure 1A:
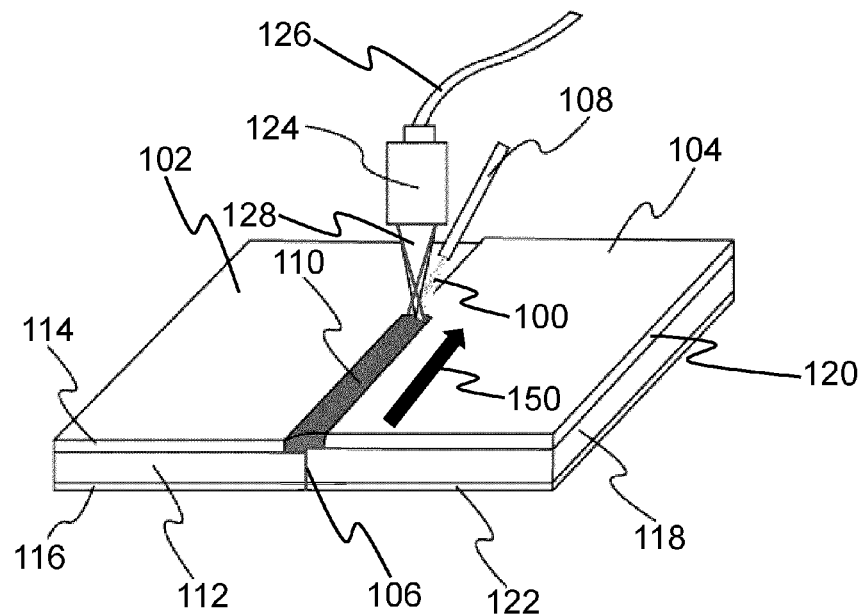
FIG. 1A is a perspective diagram showing a laser-cladding step of a two-step process, according to an embodiment of the invention, in which a clad layer of an alloying material is formed along a future weld joint between adjacent edges of pre-coated sheet metal plates.
Figure 1B:
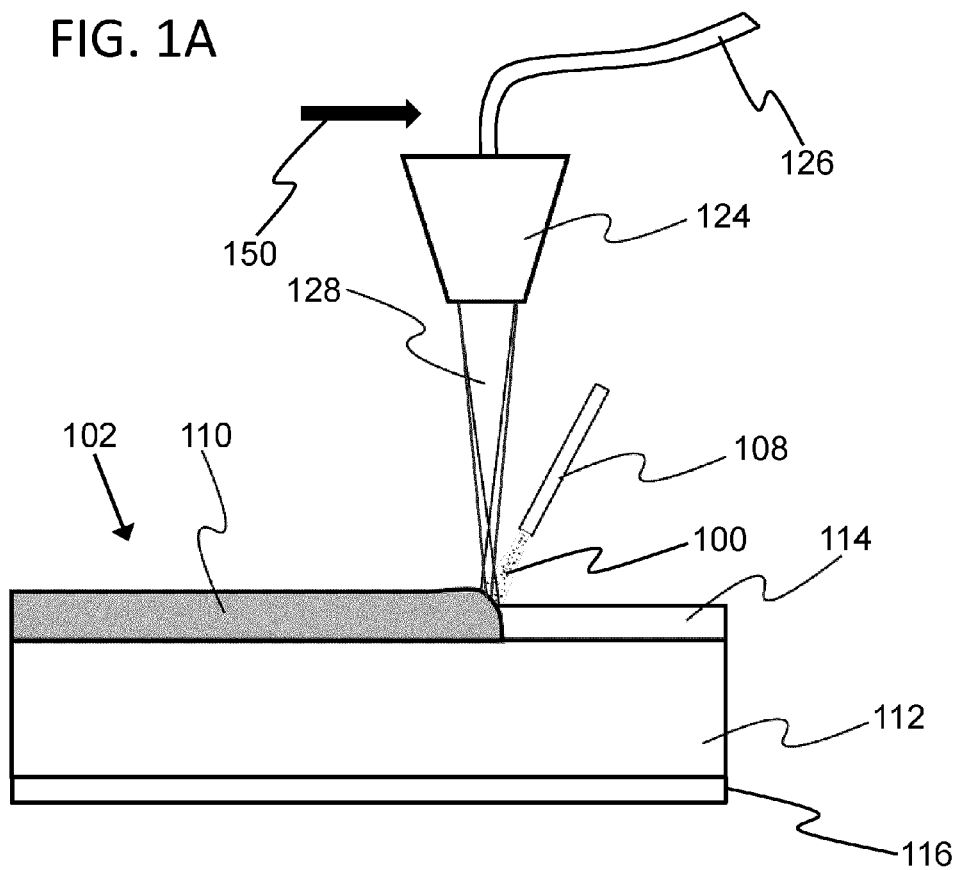
FIG. 1B is a side view showing the edge of one of the pre-coated sheet metal plates of FIG. 1A during the laser-cladding step of the two-step process.
Figure 2A:
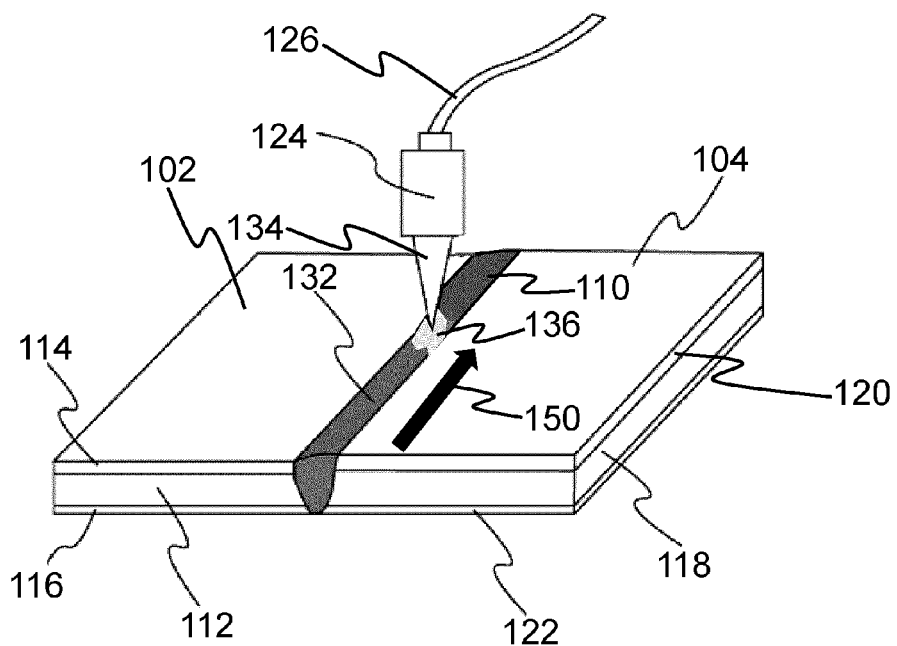
FIG. 2A is a perspective diagram showing a laser-welding step of the two-step process, according to an embodiment of the invention, in which the alloying material from the clad layer is mixed into the melt pool.
Figure 2B:
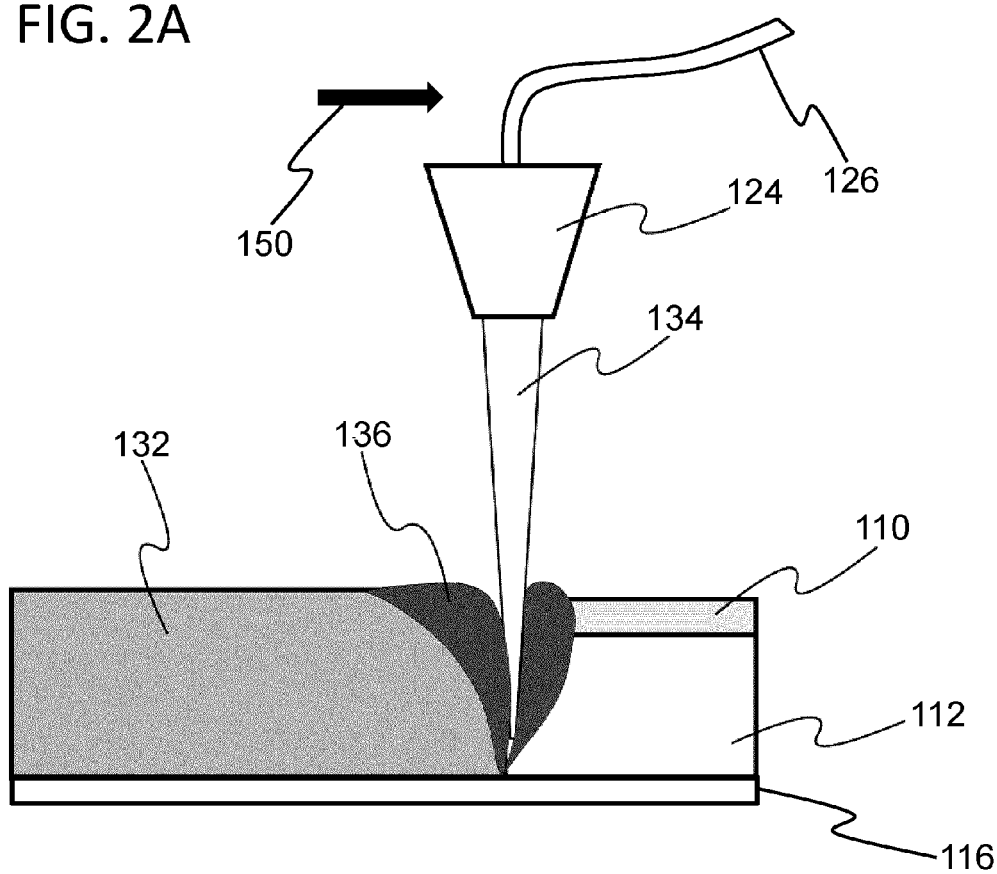
FIG. 2B is a side view showing the edge of one of the pre-coated sheet metal plates of FIG. 2A during the laser-welding step of the two-step process.

FIGS. 1A and 1B depict a first step of a two-step laser-welding process, according to an embodiment of the invention. FIGS. 2A and 2B depict a second step of the two-step laser-welding process. More particularly, FIG. 1A is a simplified perspective diagram showing the first step, in which an alloying material in powdered form 100 is laser cladded onto pre-coated steel sheet plates 102 and 104, along a seam 106 between the adjacent edges of the plates 102 and 104. FIG. 1B depicts an edge of the plate 102 along the seam 106, also during the first step. By way of a specific and non-limiting example the alloying material in powdered form 100 comprises at least one of nickel and chromium, and is provided via a powder delivery conduit, such as for instance lateral conduit 108 that is in communication with a not illustrated source of the alloying material. Optionally, lateral conduit 108 includes a not illustrated nozzle at an outlet end thereof for controlling the delivery of the powdered alloying material. Plate 102 includes a substrate 112, which has a first pre-coat layer 114 disposed on one side thereof and a second pre-coat layer 116 disposed on a second side thereof that is opposite the first side. Similarly, plate 104 includes a substrate 118, which has a first pre-coat layer 120 disposed on one side thereof and a second pre-coat layer 122 disposed on a second side thereof that is opposite the first side. In the example that is shown in FIG. 1A the substrate 118 is relatively thicker than the substrate 112, but optionally the substrates have the same thickness. By way of a specific and non-limiting example the substrates 112 and 118 are fabricated from boron steels, and may be dissimilar e.g. having different mechanical properties and/or different alloy compositions. The pre-coat layers 114, 116, 120 and 122 are formed in a known manner, such as for instance by dip-coating the substrates 112 and 118 in a bath of molten aluminum or molten aluminum alloy. In FIG. 1A the plates 102 and 104 are shown in an arrangement such that the edges of the plates that are to be welded together are butted against one another to define the seam 106. Optionally, the plates 102 and 104 are arranged one relative to the other to form a different type of weld joint, such as for instance a lap weld joint.

It is to be understood that, for simplicity, the pre-coat layers 114, 116, 120 and 122 are depicted in FIGS. 1A and 1B (as well as FIGS. 2A and 2B and FIGS. 3A and 3B) as a single layer. However, in practice the pre-coat layers comprises an intermetallic alloy layer that is in contact with the steel substrate 102 or 104, and a metallic alloy layer that is in contact with the intermetallic alloy layer. Typically, the material of the pre-coat layers 114, 116, 120 and 122 has a melting temperature that is much lower than the melting temperature of the underlying steel substrate 102 or 104. For instance, an aluminum-silicon alloy coating has a melting temperature lower than 600° C., compared to about 1500° C. for the steel substrate.

Referring now to both of FIGS. 1A and 1B, during the first step a laser optic assembly 124 receives laser light from a continuous-wave laser source via a fiber, which is referred to collectively as laser source 126, and launches a defocused and relatively low power laser beam 128 toward adjacent surface areas of the plates 102 and 104 on either side of the seam 106. By way of an example, the laser optic assembly 124 includes at least a lens, and the fiber of the laser source 126 is either a single core fiber or a multiple core fiber bundle. The defocused and low power laser beam 128 melts the powdered alloying material 100, as it is being supplied via the conduit 108, and the melted alloying material subsequently consolidates and solidifies, thereby forming a clad layer of the alloying material 110 on top of the pre-coat layers 114 and 120. The defocused and low power laser beam 128 is scanned, relative to the substrates 102 and 104, in the direction that is indicated by block arrow 150 in FIGS. 1A and 1B, such that the clad layer 110 extends along the length of the seam 106.

Referring now to FIG. 2A, shown is simplified perspective diagram of the second step of the laser-welding process, in which the alloying material from the cladded layer 110 is mixed into a melt pool 136 during formation of a laser weld 132 between the plates 102 and 104. FIG. 2B depicts the edge of the plate 102 that is disposed along the seam 106, also during formation of the laser weld 132. As is shown in FIGS. 2A and 2B, a focused and high power laser beam 134 is scanned relative to the plates 102 and 104 in the direction that is indicated by block arrow 150. The focused and high power laser beam 134 has sufficient power and intensity to melt the material of the substrates 112 and 118, thereby forming a melt pool 136. During laser welding the clad layer of alloying material 110 and the material of the pre-coat layers 114 and 120 that is adjacent the seam 106 is also melted and becomes mixed into the melt pool 136. The alloying material from the clad layer 110 is, for instance, a nickel rich material and is capable of forming a compound with the aluminum that enters the melt pool 136 from the pre-coat layers 114 and 120. For instance at least one of $Ni_3Al$ and $NiAl$ is formed in the melt pool 136 and remains stable in the melt pool 136. Advantageously, the nickel in the alloying material is a martensitic promoter, and as such the presence of nickel in the melt pool 136 at least partially compensates for the adverse effects of the aluminum that is introduced from the pre-coat layers 114 and 120 during laser-welding. Optionally, the alloying material also includes chromium, which in combination with nickel can improve the properties of the weld joint and result in greater hardenability, higher impact strength and fatigue resistance, as well as higher notch toughness. Advantageously, corrosion resistance may also be improved as a result of the stable compounds that are formed in the melt pool 136.

The two-step laser-welding process that is described above may be carried out at a single workstation, and the same laser optics 124 and laser source 126 may be controlled to scan the defocused and low power laser beam 128 during the first step as well as the focused and high power laser beam 134 during the second step. Advantageously, both steps may be performed at the same workstation, resulting in decreased labor costs and better utilization of floor space. Further advantageously, there is no need to partially or completely remove the material of the pre-coat layers adjacent to the weld seam 106 prior to laser-welding the plates 102 and 104 together. The welds that are produced using the two-step process have improved corrosion resistance, and it is possible to alter or tailor the mechanical properties of the laser welds to better match the materials that are being joined. Of course, the use of powdered alloying materials requires adequate safety equipment and additional cleanup due to unused powder that may be deposited on the work pieces and in the immediate working environment.

Figure 3A:
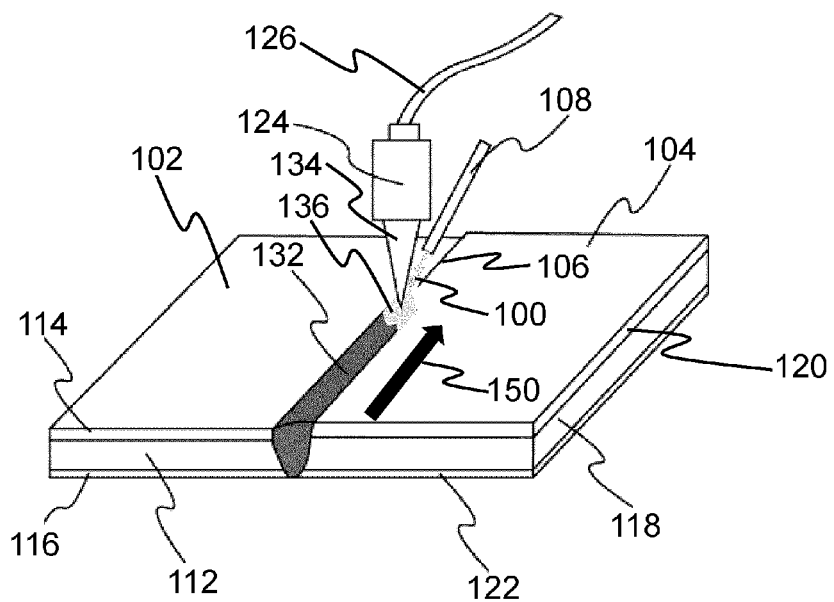
FIG. 3A is a perspective diagram showing a one-step process, according to an embodiment of the invention, in which an alloying material in powdered form is directed into a melt pool that is formed when pre-coated sheet metal plates are being laser welded together.
Figure 3B:
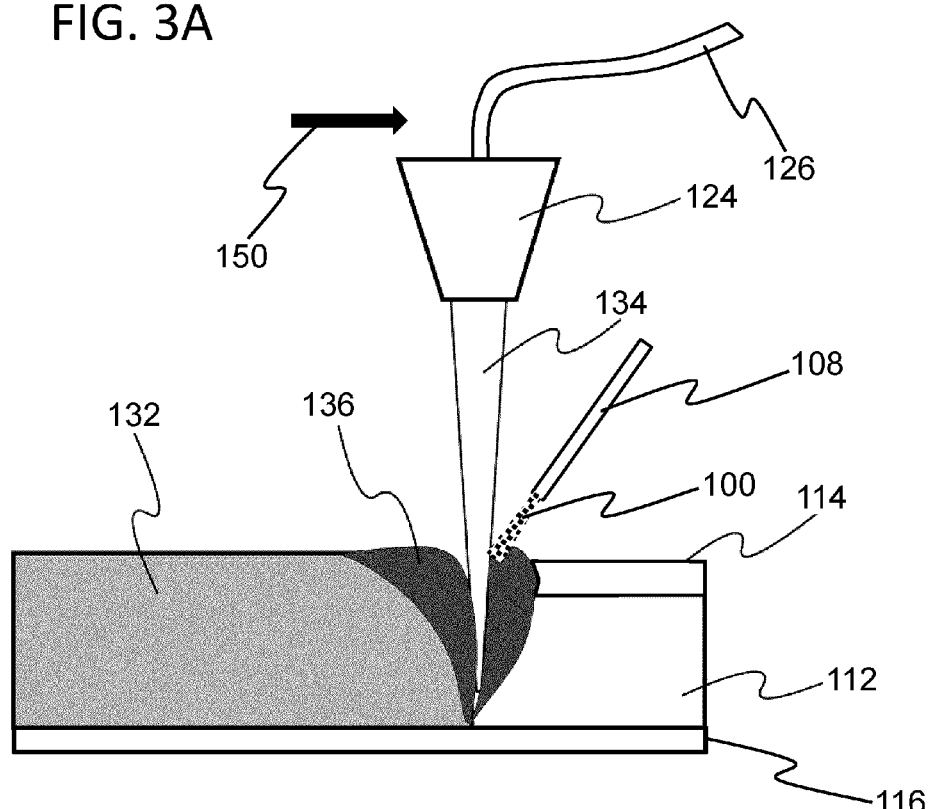
FIG. 3B is a side view showing the edge of one of the pre-coated sheet metal plates of FIG. 3A during the one-step process.

Referring now to FIGS. 3A and 3B, shown is a one-step laser-welding process according to an embodiment of the invention. In particular, FIG. 3A is a simplified perspective diagram showing the one-step laser-welding process, in which an alloying material in powdered form 100 is melted and introduced directly into a melt pool 136 that is formed when pre-coated steel sheet plates 102 and 104 are laser-welded together along seam 106. FIG. 3B depicts the edge of the plate 102 that is arranged along the seam 106, also during the one-step laser-welding process. During the one-step laser-welding process, a focused and high-powered laser beam 134 melts the material of the substrates 112 and 118, thereby forming the melt pool 136. Additionally, the focused and high-powered laser beam 134 melts the pre-coat layers 114 and 120 adjacent to the seam 106, which causes aluminum from the pre-coat layers 114 and 120 to enter the melt pool 136. The focused and high-powered laser beam 134 also melts the powdered alloying material 100 that is provided via a powder delivery conduit, such as for instance lateral conduit 108, and which becomes mixed into the melt pool 136. Optionally, lateral conduit 108 includes a not illustrated nozzle at an outlet end thereof for controlling the delivery of the powdered alloying material. The alloying material is, for instance, a nickel rich material that is capable of forming a compound with the aluminum that enters the melt pool 136 from the pre-coat layers 114 and 120. For instance at least one of $Ni_3Al$ and NiAl is formed in the melt pool, which remains stable in the weld pool and is present in the weld metal after cooling is complete. Advantageously, the nickel in the alloying material is a martensitic promoter, and as such the presence of nickel in the melt pool 136 at least partially compensates for the adverse effects of the aluminum that is introduced from the pre-coat layers 114 and 120. Optionally, the alloying material also includes chromium, which in combination with nickel can improve the properties of the weld joint and result in greater hardenability, higher impact strength and fatigue resistance, as well as higher notch toughness. Advantageously, corrosion resistance may also be improved as a result of the stable compounds that are formed in the melt pool 136.

The one-step laser-welding process that is described above may be carried out at a single workstation, and advantageously there is no need to partially or completely remove the material of the pre-coat layers adjacent to the weld seam 106 prior to laser-welding the plates 102 and 104 together. The welds that are produced using the one-step process have improved corrosion resistance, and it is possible to alter or tailor the mechanical properties of the laser welds to better match the materials that are being joined. Of course, the use of powdered alloying materials requires adequate safety equipment and additional cleanup due to unused powder that may be deposited on the work pieces and in the immediate working environment.

Figure 4A:
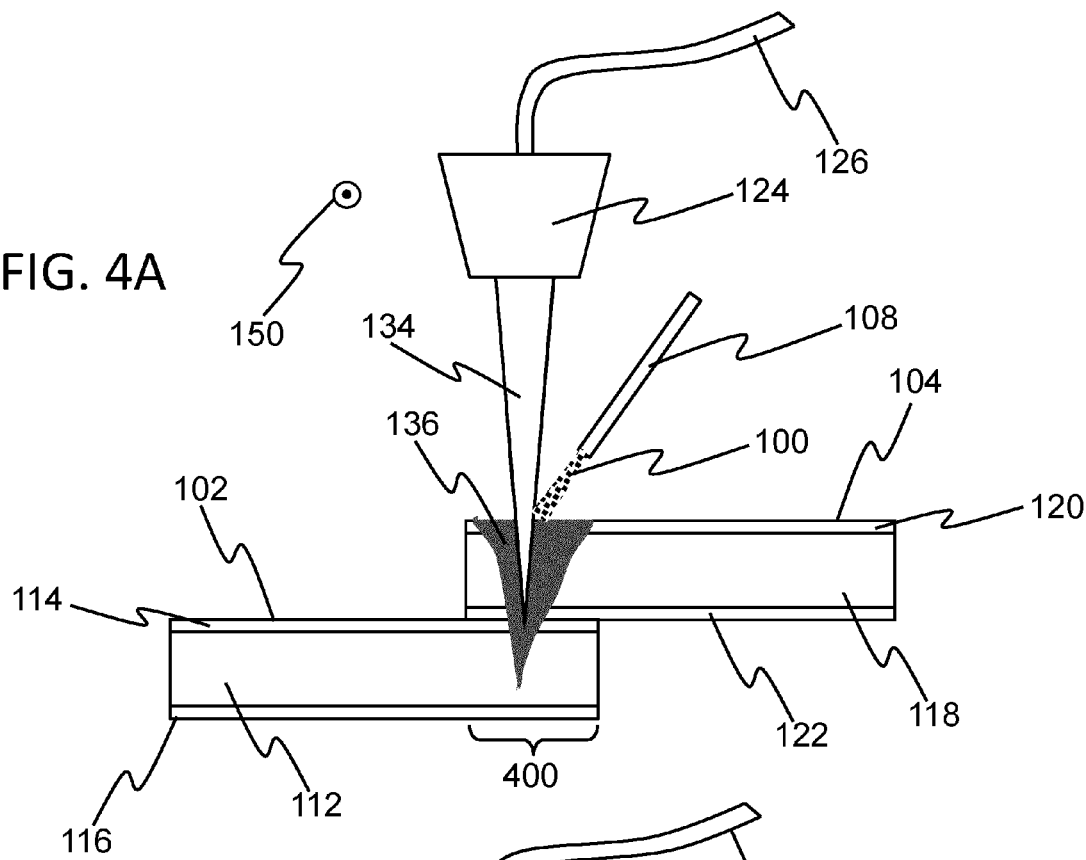
FIG. 4A is an end view showing the formation of a lap weld using the one-step process.
Figure 4B:
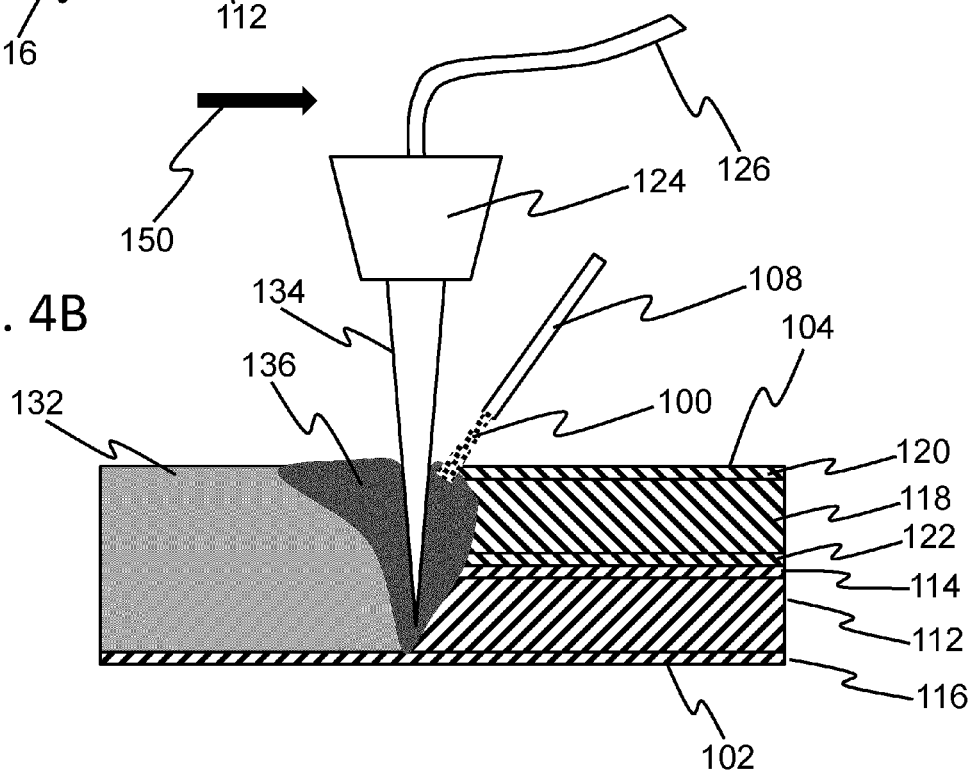
FIG. 4B is a cross-sectional side view along the lap weld of FIG. 4A.

The weld joints described with reference to FIGS. 1-3 are butt welds, in which the edge of one plate 102 is butted up against the edge of the other plate 104, and both plates lie in the same plane. Of course, the two step process and the one step process described above may also be used to form different types of welds, such as for instance a lap weld. FIG. 4A is an end view showing the formation of a lap weld using the one-step process, and FIG. 4B is a cross-sectional side view along the lap weld of FIG. 4A. In FIGS. 4A and 4B the plates 102 and 104 are disposed in different planes, one above the other, such that an area of overlap 400 exists along the edges of the plates 102 and 104. A focused and high power laser beam 134 is scanned in a direction that is out of the plane of the page, as indicated by arrow 150 in FIG. 4A, thereby melting the material of the substrate 118 and pre-coat layers 120 and 122 of plate 104, as well as the material of the pre-coat layer 114 and at least some of the substrate 112 of plate 102, thereby forming melt pool 136. Simultaneously, the alloying material in powdered form 100 is supplied via a powder delivery conduit, such as for instance lateral conduit 108, directly into the melt pool 136. Optionally, lateral conduit 108 includes a not illustrated nozzle at an outlet end thereof for controlling the delivery of the powdered alloying material. As shown in FIG. 4B, as the focused and high power laser beam 134 is scanned in the direction that is indicated by arrow 150, the weld 132 is formed as the metal of the melt pool 136 cools after the focused and high power laser beam 134 moves onward.

Referring still to FIGS. 4A and 4B, the alloying material is, for instance, a nickel rich material that is capable of forming a compound with the aluminum that enters the melt pool 136 from the pre-coat layers 120, 122 and 114. For instance at least one of $Ni_3Al$ and NiAl is formed in the melt pool, which remains stable in the weld pool and is present in the weld metal after cooling is complete. Advantageously, the nickel in the alloying material is a martensitic promoter, and as such the presence of nickel in the melt pool 136 at least partially compensates for the adverse effects of the aluminum that is introduced from the pre-coat layers. Optionally, the alloying material also includes chromium, which in combination with nickel can improve the properties of the weld joint and result in greater hardenability, higher impact strength and fatigue resistance, as well as higher notch toughness. Advantageously, corrosion resistance may also be improved as a result of the stable compounds that are formed in the melt pool 136.

Of course, the two step process can undergo similar modification and be used to form lap joints between pre-coated sheet metal plates. For instance, a clad layer of the alloying material may be formed along the future weld joint on the top one of the plates, such as for instance plate 104 as shown in FIGS. 4A and 4B. Subsequent to forming the clad layer of the alloying material, a focused and high power laser beam is scanned along the clad layer, thereby melting and mixing the alloying material into a melt pool. The nickel and/or chromium that is present in the clad layer of the alloying material forms compounds with aluminum that has entered the melt pool from the pre-coat layers of the sheet metal plates, as discussed above with reference to FIGS. 1 to 4.

While the above description constitutes a plurality of embodiments of the present invention, it will be appreciated that the present invention is susceptible to further modification and change without departing from the fair meaning of the accompanying claims.

What is claimed is:
1. A process for laser welding together sheet metal plates, the sheet metal plates being pre-coated with an aluminum-silicon containing layer, the process comprising:
arranging the pre-coated sheet metal plates one relative to the other such that an edge of one of the plates is adjacent to and in contact with an edge of the other one of the plates;
forming a laser weld joint along the adjacent edges of the pre-coated sheet metal plates, absent removing the aluminum-silicon containing layer from along said adjacent edges, such that aluminum from the aluminum-silicon containing layer enters a melt pool that is formed during forming the laser weld joint; and
introducing an alloying material into the melt pool during forming the laser weld joint, wherein the alloying material and at least some of the aluminum that enters the melt pool from the aluminum-silicon layer forms a compound in the melt pool.

2. The process of claim 1, wherein introducing the alloying material into the melt pool comprises introducing a nickel containing alloying material into the melt pool.

3. The process of claim 1, wherein introducing the alloying material into the melt pool comprises introducing a nickel and chromium containing material into the melt pool.

4. The process of claim 1, comprising, prior to forming the laser weld joint and absent removing the aluminum-silicon containing layer from along said adjacent edges, forming a clad layer of the alloying material along the adjacent edges of the pre-coated sheet metal plates.

5. The process of claim 4, wherein forming the clad layer of the alloying material and forming the laser weld joint are performed absent transferring the pre-coated sheet metal plates from one work station to another.

6. The process of claim 1, comprising feeding the alloying material into the melt pool during forming the laser weld joint.

7. The process of claim 6, wherein feeding the alloying material comprises directing a flow of the alloying material in powdered form into the melt pool.

8. The process of claim 1, wherein the laser weld joint is a butt joint or a lap joint.

9. A process for laser welding together sheet metal plates, the sheet metal plates having a substrate that is pre-coated with an aluminum-silicon containing layer, the process comprising:
  arranging a first pre-coated sheet metal plate relative to a second pre-coated sheet metal plate, such that an edge of the first plate and an edge of the second plate are disposed adjacent to one another and define an interface between the first plate and the second plate;
  scanning a defocused laser beam along the interface between the first plate and the second plate, thereby irradiating the adjacent edges of the first and second plates;
  during scanning the defocused laser beam, directing a powdered alloying material toward the irradiated edges of the first and second plates, thereby forming a clad layer of the powdered alloying material onto the aluminum-silicon containing pre-coat layer; and
  subsequent to forming the clad layer, scanning a focused laser beam along the interface between the first plate and the second plate to form a laser weld joint therebetween,
  wherein the focused laser beam creates a melt pool comprising substrate material from the first and second plates, aluminum from the aluminum-silicon containing pre-coat layer, and alloying material from the clad layer; and
  wherein the alloying material forms a compound with at least some of the aluminum in the melt pool.

10. The process of claim 9, comprising using only one laser source for scanning both the defocussed laser beam and the focused laser beam.

11. The process of claim 9, wherein directing the powdered alloying material comprises directing a nickel containing alloying material.

12. The process of claim 9, wherein directing the powdered alloying material comprises directing a nickel and chromium containing alloying material.

13. The process of claim 9, wherein scanning the defocussed laser beam and scanning the focused laser beam are performed absent transferring the pre-coated sheet metal plates from one work station to another.

14. The process of claim 9, wherein the laser weld joint is a butt joint or a lap joint.

15. The process of claim 9, wherein a thickness of the substrate material of the first plate is different than a thickness of the substrate material of the second plate.

16. The process of claim 9, wherein a thickness of the aluminum-silicon containing pre-coat layer of the first plate is different than a thickness of the aluminum-silicon containing pre-coat layer of the second plate.

17. The process of claim 9, wherein a composition of the substrate material of the first plate is different than a composition of the substrate material of the second plate.

18. A process for laser welding together sheet metal plates, the sheet metal plates being pre-coated with an aluminum-silicon containing layer, the process comprising:
  arranging a first pre-coated sheet metal plate relative to a second pre-coated sheet metal plate, such that an edge of the first plate and an edge of the second plate are adjacent to one another and define an interface between the first plate and the second plate; and
  forming a laser weld joint, comprising:
  in a single pass, irradiating with a focused laser beam an area of each of the plates that is adjacent the interface, so as to form a melt pool that includes aluminum from the aluminum-silicon containing layer within the irradiated area of each plate; and
  during irradiating, introducing an alloying material into the melt pool,
  wherein the alloying material forms a compound with at least some of the aluminum in the melt pool.

19. The process according to claim 18, wherein introducing the alloying material into the melt pool comprises directing a flow of powdered alloying material into the melt pool via a powder delivery conduit.

20. The process according to claim 18, wherein the alloying material comprises nickel.

21. The process according to claim 18, wherein the alloying material comprises nickel and chromium.

22. The process of claim 18, wherein the laser welded joint is a butt joint or a lap joint.

23. A system for laser-welding together pre-coated sheet metal plates, comprising:
  a support for holding a first pre-coated sheet metal plate in a predetermined orientation relative to a second pre-coated sheet metal plate, such that an edge of the first plate and an edge of the second plate are disposed adjacent to one another and define an interface;
  at least one laser optic assembly in optical communication with a laser source;
  at least one actuator for relatively moving the at least one laser optic assembly relative to the support; and
  a powder delivery conduit in communication with a source of a powdered alloying material and having an outlet end disposed in front of the at least one laser optic along a scanning direction, the position of the outlet end of the powder delivery conduit being fixed relative to the at least one laser optic for directing a stream of the powdered alloying material toward a predetermined point along the interface during relatively moving the at least one laser optic assembly relative to the support.

* * * * *